United States Patent
Chou et al.

(10) Patent No.: US 10,336,840 B2
(45) Date of Patent: Jul. 2, 2019

(54) PROPYLENE ETHYLENE RANDOM COPOLYMER SUITABLE FOR PIPE

(71) Applicant: W. R. Grace & Co.-Conn., Columbia, MD (US)

(72) Inventors: Chai-Jing Chou, Sugar Land, TX (US); Daniel W. Baugh, III, Lake Jackson, TX (US); John Kaarto, Missouri City, TX (US); Jan W. Van Egmond, Charleston, WV (US); Jeffrey D. Goad, Barboursville, WV (US); William G. Sheard, Hallsville, TX (US)

(73) Assignee: W. R. Grace & Co.-Conn., Columbia, MD (US)

( * ) Notice: Subject to any disclaimer, the term of this patent is extended or adjusted under 35 U.S.C. 154(b) by 93 days.

(21) Appl. No.: 15/030,786

(22) PCT Filed: Oct. 28, 2014

(86) PCT No.: PCT/US2014/062596
§ 371 (c)(1),
(2) Date: Apr. 20, 2016

(87) PCT Pub. No.: WO2015/065990
PCT Pub. Date: May 7, 2015

(65) Prior Publication Data
US 2016/0251462 A1    Sep. 1, 2016

Related U.S. Application Data

(60) Provisional application No. 61/896,981, filed on Oct. 29, 2013.

(51) Int. Cl.
*C08F 210/06* (2006.01)
*F16L 11/06* (2006.01)
(Continued)

(52) U.S. Cl.
CPC ............ *C08F 210/06* (2013.01); *F16L 9/127* (2013.01); *F16L 11/06* (2013.01); *F16L 11/125* (2013.01)

(58) Field of Classification Search
USPC .................................................. 526/213, 348
See application file for complete search history.

(56) References Cited

U.S. PATENT DOCUMENTS

| 2005/0053741 A1 | 3/2005 | Ebner et al. |
| 2010/0168342 A1 | 7/2010 | Sheard et al. |

(Continued)

FOREIGN PATENT DOCUMENTS

| CN | 1604922 A | 4/2005 |
| CN | 102325809 A | 1/2012 |

(Continued)

OTHER PUBLICATIONS

Chinese Search Report for Application No. 201480071592.4 dated Feb. 5, 2018, pp. 2.

(Continued)

*Primary Examiner* — Lee E Sanderson
*Assistant Examiner* — Michael C Romanowski
(74) *Attorney, Agent, or Firm* — Lerner, David, Littenberg, Krumholz & Mentlik, LLP

(57) ABSTRACT

A composition is provided which comprises a propylene ethylene random copolymer having a melt flow rate (MFR) (as determined according to ASTM D1238, 230° C., 2.16 Kg) of less than 1 g/10 min, a xylene solubles content of less than 7% by weight, an ethylene content of from 3 to 5 percent by weight of the copolymer, and a value equal to or greater than 92 for the product of the Koenig B value times the % mm triads measured on the xylene insoluble fraction (Continued)

of the random copolymer obtained by the wet method. Pipes made from the composition demonstrate improved pressure endurance.

10 Claims, 1 Drawing Sheet

(51) Int. Cl.
 *F16L 11/12* (2006.01)
 *F16L 9/127* (2006.01)

(56) References Cited

U.S. PATENT DOCUMENTS

| 2010/0197874 | A1* | 8/2010 | Sheard | C08F 10/06 526/213 |
|---|---|---|---|---|
| 2011/0123745 | A1 | 5/2011 | Ek et al. | |

FOREIGN PATENT DOCUMENTS

| EP | 1312623 | A1 | 5/2003 | |
| WO | 2010078479 | A1 | 7/2010 | |
| WO | 2010140745 | | 12/2010 | |
| WO | WO-2010140745 | A1 * | 12/2010 | ............ C08F 210/06 |
| WO | 2013003062 | A1 | 1/2013 | |
| WO | 2013016647 | | 1/2013 | |
| WO | 2013029699 | A1 | 3/2013 | |

OTHER PUBLICATIONS

Supplementary European Search Report for Application No. EP14859056 dated Jun. 7, 2017.
Singapore Search Report for Application No. 11201603120R dated Jul. 4, 2017.
Chinese Search Report for CN Application No. 201480071592.4, dated Nov. 21, 2018.

* cited by examiner

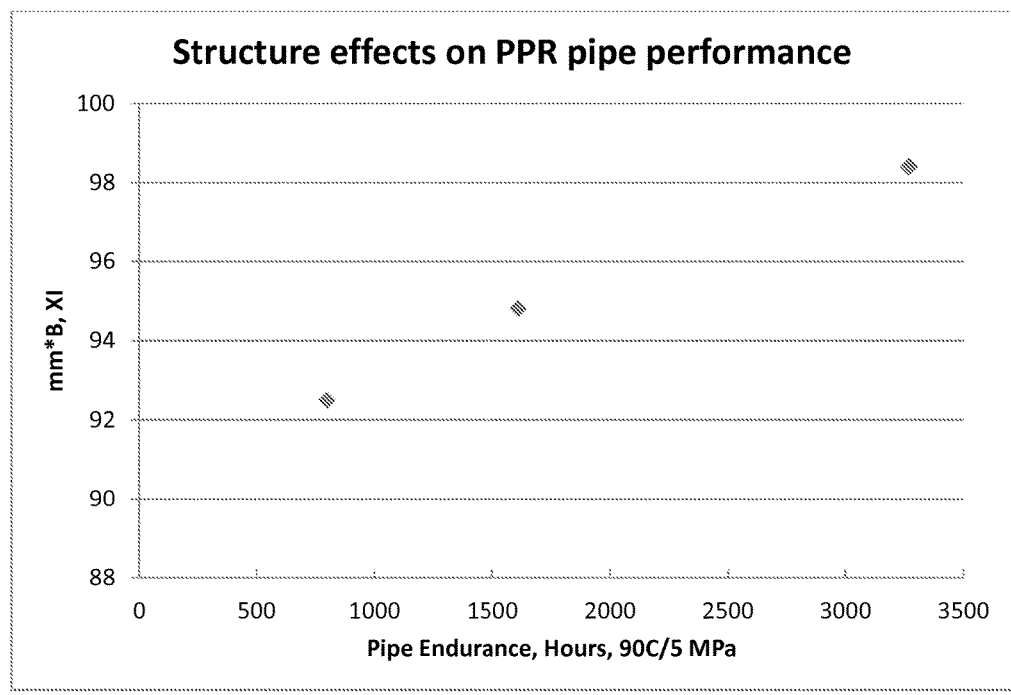

PROPYLENE ETHYLENE RANDOM COPOLYMER SUITABLE FOR PIPE

CROSS-REFERENCE TO RELATED APPLICATIONS

The present application is a national phase entry under 35 U.S.C. § 371 of International Application No. PCT/US2014/062596, filed on Oct. 28, 2014, which claims priority from U.S. Provisional Patent Application No. 61/896,981 filed Oct. 29, 2013, entitled "PROPYLENE ETHYLENE RANDOM COPOLYMER SUITABLE FOR PIPE", the disclosures of which are hereby incorporated herein by reference.

FIELD OF THE INVENTION

The invention relates to a pressure pipe with increased long-term pressure resistance comprising a polypropylene random copolymer composition.

BACKGROUND OF THE INVENTION

Polymer materials are frequently used for pipes for various purposes, such as fluid transport, i.e. transport of liquid or gas, e.g. water or natural gas, during which the fluid can be pressurized. Moreover, the transported fluid may have varying temperatures, usually within the temperature range of about 0° C. to about 70° C. Such pipes are preferably made of polyolefins, usually polyethylene or polypropylene.

Because of the high temperatures involved, hot water pipes of polymer materials represent a particularly problematic type of polymer pipe. Not only must a hot water polymer pipe fulfill the requirements necessary for other ordinary polymer pipes, such as cold water pipes, but in addition it must withstand the strain associated with higher temperatures. The temperatures of the hot water in a hot water pipe, typically used for plumbing and heating purposes, range from 30-70° C., which means that the pipe must be able to withstand a higher temperature than that for a secure long term use. Peak temperatures may be as high as 100° C.

According to the draft standard prEN 12202 a hot water polypropylene pipe must meet the requirement of at least 1000 hours before failure at 95° C. and 3.5 MPa pressure if it is a random copolymer.

Austrian patent AT 404 294 B discloses a pressure pipe which consists of a homopolymer of polypropylene which consists predominantly of the hexagonal β-form of polypropylene with a nucleating agent which is based on an amide. These pipes have an increased resistance to rapid crack propagation. The published Japanese patent application JP 05-170932 discloses polypropylene pipes for water supply purposes. It is disclosed, that by adding certain antioxidants to different kinds of polypropylene, the endurance time of these pipes can be increased. None of these documents discloses polypropylene pipes with an increased long-term pressure resistance.

BRIEF SUMMARY OF THE INVENTION

Presently disclosed are pressure pipes with increased long-term pressure resistance which are comprised of a polypropylene composition. This performance is achieved at least in part by a polypropylene composition which is comprised of a propylene ethylene random copolymer having defined properties. For example, a suitable copolymer comprises the following properties: (A) a melt flow rate (MFR) less than 1 g/10 min as determined according to ASTM D1238, at 230° C. and 2.16 Kg; (B) an ethylene content of from 3 to 5 percent by weight of the random copolymer; and (C) the xylene insoluble fraction of the random copolymer obtained by the wet method exhibits a [(Koenig B value)*(% mm)]≥92. Alternatively, the copolymer exhibits a PDI≥4.5, xylene solubles content measured by the wet method (hereinafter described) ≤5% by weight and a Koenig B value of the xylene insoluble fraction of the copolymer 0.95 and a percentage mm of the xylene insoluble fraction of the copolymer 97. Pipes made using such compositions will exhibit higher pressure endurance results than other polypropylene based pipes.

BRIEF DESCRIPTION OF THE DRAWINGS

FIG. 1 illustrates pipe endurance performance for pipes manufactured using polymers in accordance with embodiments of the present disclosure.

DETAILED DESCRIPTION OF THE INVENTION

In a first embodiment of the present invention there is provided a propylene ethylene random copolymer having the following properties: (A) a melt flow rate (MFR) less than 1 g/10 min as determined according to ASTM D1238, at 230° C. and 2.16 Kg; (B) an ethylene content of from 3 to 5 percent by weight of the random copolymer; and (C) the xylene insoluble fraction of the random copolymer obtained by the wet method exhibits a [(Koenig B value)*(% mm)] ≥92.

In a second embodiment a pipe having a pressure endurance of at least 700 hours when tested at 90° C. and 5 MPa is provided, where such pipe is made from a composition comprising a propylene ethylene random copolymer having the following properties: (A) a melt flow rate (MFR) less than 1 g/10 min as determined according to ASTM D1238, at 230° C. and 2.16 Kg; (B) an ethylene content of from 3 to 5 percent by weight of the random copolymer; and (C) the xylene insoluble fraction of the random copolymer obtained by the wet method exhibits a [(Koenig B value)*(% mm)] ≥92.

(a) Propylene/Ethylene Random Copolymer

In a first embodiment of the present invention a composition is provided which comprises a propylene ethylene random copolymer having the following properties: (A) a melt flow rate (MFR) less than 1 g/10 min as determined according to ASTM D1238, at 230° C. and 2.16 Kg; (B) an ethylene content of from 3 to 5 percent by weight of the random copolymer; and (C) the xylene insoluble fraction of the random copolymer obtained by the wet method exhibits a [(Koenig B value)*(% mm)]≥92.

The term "propylene/ethylene copolymer", as used herein, is a copolymer containing, in polymerized form, (i) a majority weight percent propylene monomer and (ii) ethylene monomer. A "propylene/ethylene random copolymer" (also sometimes referred to as a polypropylene random copolymer, PPR, PP-R, RCP or RACO) is a polymer having individual repeating units of the ethylene monomer present in a random or statistical distribution in the polymer chain.

The "Koenig B-value" or "B-value" or chi statistic is one measure of randomness or blockiness in a propylene ethylene random copolymer. A value of 1.0 indicates a random copolymer and a value of zero indicates complete blocks of monomers A and B; in the present case, propylene and ethylene. A B-value of 2 indicates an alternating copolymer. The B-value is calculated as: B=[EP]/(2[P][E]), where [EP]

is the total mole fraction of EP dimers (EP+PE, or (EEP+PPE+PEP+EPE)), and [E] is the mole fraction ethylene, and [P]=1−[E]. See Koenig, Jack L.; *Spectroscopy of Polymers*, 2$^{nd}$ ed. for details of determining and calculating the B-value.

Melt flow rate (MFR) is measured in accordance with ASTM D 1238 test method at 230° C. with a 2.16 kg weight for propylene-based polymers.

Xylene Solubles (XS) is the weight percent of resin that remains in solution after a sample of polypropylene random copolymer resin is dissolved in hot xylene and the solution is allowed to cool to 25° C. This is also referred to as the gravimetric XS method according to ASTM D5492-06 and is also referred to herein as the "wet method". XS can also be measured according to a correlated method referred to as the Viscotek method, as follows: 0.4 g of polymer is dissolved in 20 ml of xylenes with stirring at 130° C. for 30 minutes. The solution is then cooled to 25° C. and after 30 minutes the insoluble polymer fraction is filtered off. The resulting filtrate is analyzed by Flow Injection Polymer Analysis using a Viscotek ViscoGEL H-100-3078 column with THF mobile phase flowing at 1.0 ml/min. The column is coupled to a Viscotek Model 302 Triple Detector Array, with light scattering, viscometer and refractometer detectors operating at 45° C. Instrument calibration is maintained with Viscotek PolyCAL™ polystyrene standards. The Viscotek method is calibrated against the gravimetric ASTM method, which is conducted as follows:

Xylene soluble portion is determined by a method adapted from ASTM D5492-06 and also sometimes referred to herein as the "wet method". The procedure consists of weighing 2 g of sample and dissolving it in 200 ml o-xylene in a 400 ml flask with 24/40 joint. The flask is connected to a water cooled condenser and the contents are stirred and heated to reflux under $N_2$, and then maintained at reflux for an additional 30 minutes. The solution is then cooled in a temperature controlled water bath at 25° C. for a minimum of 45 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. Xylene soluble portion is calculated as XS (wt %)=[$(m_3-m_2)*2/m_1$]*100, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

The term "tacticity" generally refers to the relative stereochemistry of adjacent chiral centers within in a macromolecule or polymer. For example, in a propylene-based polymer, the chirality of adjacent monomers, such as two propylene monomers, can be of either like or opposite configuration. The term "diad" is used to designate two contiguous monomers; three adjacent monomers are called a triad. If the chirality of adjacent monomers is of the same relative configuration, the diad is considered isotactic; if opposite in configuration, it is termed syndiotactic. Another way to describe the configurational relationship is to term contiguous pairs of monomers having the same chirality as meso (m) and those of opposite configuration racemic (r).

Tacticity or stereochemistry of macromolecules generally and polypropylene or polypropylene random copolymers in particular can be described or quantified by referring to triad concentration. An isotactic triad, typically identified with the shorthand reference "mm", is made up of two adjacent meso diads, which have the same configuration, and so the stereoregularity of the triad is identified as "mm". If two adjacent monomers in a three-monomer sequence have the same chirality and that is different from the relative configuration of the third unit, this triad has 'mr' tacticity. An 'rr' triad has the middle monomer unit having an opposite configuration from either neighbor. The fraction of each type of triad in the polymer can be determined and when multiplied by 100 indicates the percentage of that type found in the polymer. The mm percentage is used to identify and characterize the polymers herein.

The sequence distribution of monomers in the polymer may be determined by $^{13}$C-NMR, which can also locate ethylene residues in relation to the neighboring propylene residues.

$^{13}$C NMR is used to measure ethylene content, Koenig B-value, triad distribution, and triad tacticity, and is performed as follows:

Sample Preparation

The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters

The data are collected using a Bruker 400 MHz spectrometer equipped with a Bruker Dual DUL high-temperature CryoProbe. The data are acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and weight % ethylene are calculated according to methods commonly used in the art, which is briefly summarized as follows:

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm). Each peak in the spectrum is assigned with reference to a literature source such as the articles in, for example, *Polymer*, T. Tsutsui et al., Vol. 30, Issue 7, (1989) 1350-1356 and/or *Macromolecules*, H. N. Cheng, 17 (1984) 1950-1955, the complete contents of which are incorporated herein by reference to the extent permitted.

In the first region, the signal of the center methyl group in a PPP (mm) triad is located. In the second region, the signal of the center methyl group in a PPP (mr) triad and the methyl group of a propylene unit whose adjacent units are a propylene unit and an ethylene unit resonates (PPE-methyl group). In the third region, the signal of the center methyl group in a PPP (rr) triad and the methyl group of a propylene unit whose adjacent units are ethylene units resonate (EPE-methyl group).

PPP (mm), PPP (mr) and PPP (rr) have the following three-propylene units-chain structure with head-to-tail bonds, respectively. This is shown in the Fischer projection diagrams below.

PPP(mm):

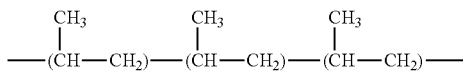

PPP(mr):

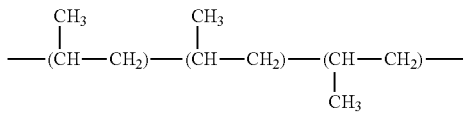

PPP(rr):

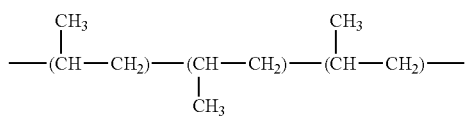

The triad tacticity (mm fraction) of the propylene random copolymer can be determined from a $^{13}$C-NMR spectrum of the propylene random copolymer using the following formula:

$$mm\ \text{Fraction} = \frac{PPP(mm)}{PPP(mm) + PPP(mr) + PPP(rr)}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The EPP area can be determined from the signal at 30.8 ppm after subtracting from it one-half the area of the sum of the signals between 26 and 27.2 ppm and the signal at 30.1 ppm. The area due to EPE can be determined from the signal at 33.2 ppm.

For convenience, ethylene content is also measured using a Fourier Transform Infrared method (FTIR) which is correlated to ethylene values determined using $^{13}$C NMR, noted above, as the primary method. The relationship and agreement between measurements conducted using the two methods is described in, e.g., J. R. Paxson, J. C. Randall, "Quantitative Measurement of Ethylene Incorporation into Propylene Copolymers by Carbon-13 Nuclear Magnetic Resonance and Infrared Spectroscopy", Analytical Chemistry, Vol. 50, No. 13, November 1978, 1777-1780.

The Koenig B-value on the xylene insoluble fraction of the copolymer obtained by the wet method is equal to or greater than 0.93, more preferably in the range of from 0.93 to 1.03, and most preferably in the range from 0.94 or 0.95 or 0.96 or 0.97 to 1. Alternatively, the xylene insoluble fraction of the copolymer exhibits individual values of 0.93, 0.94, 0.95, 0.96, 0.97, 0.98, 0.99, 1.0, 1.01, 1.02 or 1.03.

The MFR for the copolymers of the present invention is less than or equal to 1 g/10 min, preferably in the range of from 0.1 to 1, more preferably in the range of from 0.15 to 0.5 g/10 min., most preferably 0.15 to 0.30 g/10 min. Alternatively, still expressing MFR in g/10 min according to the above-identified ASTM test and conditions, suitable copolymer MFR values are greater than zero and less than 1, less than 0.9, less than 0.8, less than 0.7, less than 0.6, less than 0.5, less than 0.4, less than 0.3, less than 0.2, or less than 0.1. Also suitable are copolymers exhibiting MFR in the range of 0.15 to less than 1; 0.2 to less than 1; 0.25 to less than 1; 0.11 to 0.75; 0.12 to 0.5, 0.1 to 0.5, etc. In other words, each of the individual values between 0.1 to 1 and each range formed by any two individual values between 0.1 to 1 will be considered to have been recited without the need for recitation of all of the permutations and combinations of values.

The xylene soluble (XS) fraction by the wet method for the copolymers of the present invention is less than or equal to ($\leq$)8% by weight of the copolymer, or $\leq$7% by weight, more preferably $\leq$6% by weight, still more preferably $\leq$5% by weight, for example, $\leq$7.5% by weight, $\leq$6.5% by weight, $\leq$5.50 by weight, $\leq$4.5% by weight, 3.5% by weight or 3.0% by weight or 2.5% by weight; preferably in the range of from 2.5% to 8.0% by weight, 3.0% to 7.0% by weight, 3.5% to 6.0% by weight, 4% to 7% by weight, more preferably from 5.5% to 6.5% by weight, alternatively from 5% to $\leq$7% by weight. In other words, each of the individual values between 2.5% to 8% by weight and each range formed by any two individual values between 2.5 to 8% will be considered to have been recited without the need for recitation of all of the permutations and combinations of values.

The ethylene content of the propylene ethylene random copolymer in compositions of the present invention is from 2.5 to 5 percent by weight of the copolymer, preferably from 3.0 to 4.5 percent, and more preferably from 3.1 to 4.4 percent or 3.2 to 4.2 percent by weight of the copolymer. Alternatively, individual values for ethylene content can be each of the values between 2.5 to 5 and each range formed by any two individual values between 2.5 to 5, and will be considered to have been recited without the need for recitation of all of the permutations and combinations of values.

Preferably the propylene ethylene random copolymer is further characterized by having a high isotacticity in the xylene insoluble fraction obtained by the wet method such that (percentage mm of the xylene insoluble fraction of the copolymer)×(Koenig B-value of the xylene insoluble fraction of the copolymer) is equal to or greater than ($\geq$) 92.0; for example from greater than 92.0 to less than 100; from 92.5 to 99; from 93 to 98.5; or from 94 to 99. In other words, each of the individual values between 92.0 to less than 100 and each range formed by any two individual values between 92.0 to less than 100 will be considered to have been recited without the need for recitation of all of the permutations and combinations of values.

Preferably the propylene ethylene random copolymer has a Poly Dispersity Index (PDI) greater than 3.5, more preferably greater than 4 or greater than 4.5 or greater than 5. Although an upper limit for PDI has not been fixed, it is believed that it would be impractical for PDI to exceed 10.0 for copolymers suitable for the application described herein. PDI is an indication as to the breadth of the molecular weight distribution and can be determined by the melt rheological measurement according ISO 6721-1. Measurements reported herein are made using the cone and plate method operated at 180° C. The values of storage modulus (G'), loss modulus (G"), and complex modulus (G*) are obtained as a function of frequency ($\omega$) and the polydispersity index is calculated from the cross-over point of G' ($\omega$) and G"($\omega$), i.e. the point at which G'($\omega c$)=G"($\omega c$)=Gc, expressed as 100,000/Gc.

Embodiments of the present invention may advantageously be nucleated. One preferred class of nucleators are beta nucleators. Beta nucleators are defined as nucleators that give rise to a high beta-crystalline form content. As beta-nucleating agent any nucleating agent can be used which is suitable for inducing crystallization of polypropylene homo- and copolymers, including polypropylene random copolymers, in the hexagonal or pseudohexagonal modification, also referred to as beta-crystalline form. Mixtures of such nucleating agents may also be employed.

Suitable types of beta-nucleating agents include any one or mixtures of aromatic diamides, characterized as reaction products of symmetrical aromatic diacids and alicyclic amines, including for example, N,N'-dicyclohexylterephthalamide and N,N'-dicyclohexyl-2,6-naphthalene dicarboxamide (commercially available as "NJSTAR NU-100", from New Japan Chemical Co., Ltd.). Also suitable is a mixed crystal of 5,12-dihydro-quino(2,3-b)acridine-7,14-dione with quino(2,3-b)acridine-6,7,13,14(5H, 12H)-tetrone; and salts of dicarboxylic acids with at least 7 carbon atoms with metals of Group 11 of the Periodic Table. Other suitable beta-nucleating agents are known in the art.

Embodiments of the present invention can be made by any process for polymerizing propylene-based polymers known in the art. This includes the UNIPOL gas phase process, using a supported Ziegler-Natta catalyst. Suitable polypropylene random copolymers may be produced using a single reactor or multiple reactors to produce a multimodal product. For some embodiments it is preferred to use electron donors which do not contain phthalates.

Processes and catalyst compositions for preparing useful PP-R copolymers are disclosed, for example, in WO 2011/084628, and others are generally disclosed in U.S. Pat. Nos. 7,381,779; 7,491,670; 7,678,868; 7,781,363; or 7,989,383. Propylene-ethylene random copolymers having high molecular weight and low MFR are produced using stereospecific catalysts and sometimes referred to as "6th generation" Ziegler-Natta catalysts containing non-phthalate internal donors, such as those disclosed in U.S. Pat. Nos. 8,288,585; 8,536,372; 8,778,826; US 2013/0338321; and/or WO 2010/078494 and others. Also suitable are so-called "4th generation" Ziegler-Natta catalysts, typically containing phthalate internal donors (e.g., diisobutyl phthalate, DIBP). Each of the forgoing cited patents are hereby incorporated by reference in their entirety to the extent permitted.

Procatalyst compositions suitable for use in producing the polypropylene random (PP-R) copolymers include Ziegler-Natta procatalyst compositions. Any conventional Ziegler-Natta procatalyst may be used in the present catalyst composition as is commonly known in the art provided it is capable of producing the claimed PP-R copolymers. In an embodiment, the Ziegler-Natta procatalyst composition contains titanium moiety such as titanium chloride, magnesium moiety such as magnesium chloride, and an internal electron donor.

In an embodiment, the internal electron donor comprises a substituted phenylene aromatic diester. In an embodiment, a 1,2-phenylene aromatic diester is provided. The substituted 1,2-phenylene aromatic diester has the structure (I) below:

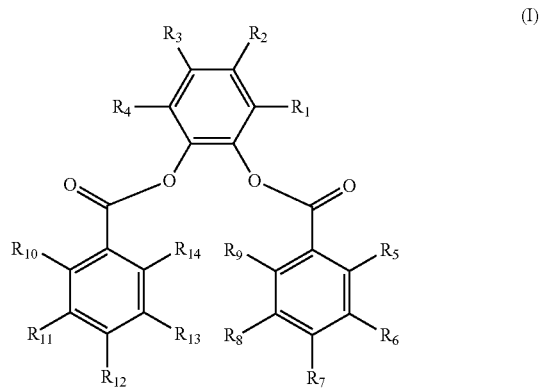

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

The procatalyst precursor can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable procatalyst precursors include halides, oxyhalides, and alkoxides of magnesium, manganese, titanium, vanadium, chromium, molybdenum, zirconium, hafnium, and combinations thereof.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation, results in precipitation of the solid precursor, having especially desirable morphology and surface area. Moreover, the resulting precursors are particularly uniform in particle size.

In an embodiment, the procatalyst precursor is a benzoate-containing magnesium chloride material ("BenMag"). As used herein, a "benzoate-containing magnesium chloride" ("BenMag") can be a procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst and/or catalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. A nonlimiting example of suitable BenMag procatalyst precursors is a catalyst of the trade names SHAC™ 103 (previously available from The Dow Chemical Company, Midland, Mich., now available from W.R. Grace & Co., Columbia, Md.) In an embodiment, the BenMag procatalyst precursor may be a product of halogenation of any procatalyst precursor (i.e., a MagMo precursor or a MagTi precursor) in the presence of a benzoate compound.

The present procatalyst composition also includes an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites and thus enhances catalyst stereoselectivity. In an embodiment, the internal electron donor includes a substituted phenylene aromatic diester of structure (I), identified above.

In an embodiment, a procatalyst composition is provided which includes a combination of a magnesium moiety, a titanium moiety and an internal electron donor. The internal electron donor includes the substituted phenylene aromatic diester. The procatalyst composition is produced by way of a halogenation procedure described in detail in U.S. Pat. No. 8,536,372, incorporated herein to the extent permitted, which converts the procatalyst precursor and the substituted phenylene aromatic diester donor into the combination of the magnesium and titanium moieties, into which the internal electron donor is incorporated. The procatalyst precursor from which the procatalyst composition is formed can be the magnesium moiety precursor, the mixed magnesium/titanium precursor, or the benzoate-containing magnesium chloride precursor.

In an embodiment, the magnesium moiety is a magnesium halide. In another embodiment, the magnesium halide is magnesium chloride, or magnesium chloride alcohol adduct. In an embodiment, the titanium moiety is a titanium halide such as a titanium chloride. In another embodiment the titanium moiety is titanium tetrachloride. In another embodiment, the procatalyst composition includes a magnesium chloride support upon which a titanium chloride is deposited and upon which the internal electron donor is incorporated.

In an embodiment, the internal electron donor of the procatalyst composition includes the substituted phenylene aromatic diester of structure (I), illustrated above, wherein $R_1$-$R_{14}$ are the same or different; each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and at least one of $R_1$-$R_{14}$ is not hydrogen.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In an embodiment, any consecutive R groups in $R_1$-$R_4$, and/or in $R_5$-$R_9$, and/or in $R_{10}$-$R_{14}$, may be members of a $C_5$-$C_6$-membered ring.

In an embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In an embodiment, structure (I) includes $R_2$ that is methyl, and each of $R_5$-$R_{14}$ is hydrogen. In an embodiment, structure (I) includes $R_2$ that is ethyl, and each of $R_5$-$R_{14}$ is hydrogen. In an embodiment, structure (I) includes $R_2$ that is t-butyl, and each of $R_5$-$R_{14}$ is hydrogen. In an embodiment, structure (I) includes $R_2$ that is ethoxycarbonyl, and each of $R_5$-$R_{14}$ is hydrogen.

In an embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ that is methyl, and each of $R_5$-$R_{14}$ is hydrogen.

In an embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In an embodiment, structure (I) includes $R_1$ that is a methyl group and $R_3$ that is a t-butyl group. Each of $R_2$, $R_4$ and $R_5$-$R_{14}$ is hydrogen.

In an embodiment, structure (I) includes $R_1$ and $R_3$ that is an isopropyl group. Each of $R_2$, $R_4$ and $R_5$-$R_{14}$ is hydrogen.

In an embodiment, structure (I) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In an embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In an embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure selected from the group consisting of structures (II)-(V), including alternatives for each of $R_1$ to $R_{14}$, that are described in detail in U.S. Pat. No. 8,536,372, incorporated herein to the extent permitted.

In an embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (I) include $R_1$ that is a methyl group and $R_3$ is a t-butyl group. Each of $R_2$, $R_4$ and $R_5$-$R_{14}$ is a fluorine atom.

In an embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an diethylamino group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (I) includes $R_1$ and $R_3$, each of which is a sec-butyl group. Each of $R_2$, $R_4$ and $R_5$-$R_{14}$ is hydrogen.

In an embodiment, structure (I) includes $R_1$ and $R_4$ that are each a methyl group. Each of $R_2$, $R_3$, $R_5$-$R_9$ and $R_{10}$-$R_{14}$ is hydrogen.

In an embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In an embodiment, another procatalyst composition is provided. The procatalyst composition includes a combination of a magnesium moiety, a titanium moiety and a mixed internal electron donor. As used herein, a "mixed internal electron donor" is (i) a substituted phenylene aromatic diester, (ii) an electron donor component that donates a pair of electrons to one or more metals present in the resultant procatalyst composition, and (iii) optionally other components. In an embodiment, the electron donor component is a phthalate, a diether, a benzoate, and combinations thereof. The procatalyst composition with the mixed internal electron donor can be produced by way of the procatalyst production procedure as previously disclosed in the previously granted patents and publications identified herein.

For example, suitable catalyst compositions comprise: a pro-catalyst composition; a co-catalyst; and an external electron donor or a mixed external electron donor (M-EED) of two or more different components. Suitable external donors include one or more activity limiting agents (ALA), one or more selectivity control agents (SCA) or both an ALA and an SCA. As used herein, an "external electron donor" is a component or a composition comprising a mixture of components added independent of procatalyst formation that modifies the catalyst performance. As used herein, an "activity limiting agent" is a composition that decreases catalyst activity as the polymerization temperature in the presence of the catalyst rises above a threshold temperature (e.g., temperature greater than about 85° C.). A "selectivity control agent" is a composition that improves polymer tacticity, wherein improved tacticity is generally understood to mean increased tacticity or reduced xylene solubles or both. It should be understood that the above definitions are not mutually exclusive and that a single compound may be classified, for example, as both an activity limiting agent and a selectivity control agent.

In an embodiment, the external electron donor includes an alkoxysilane. The alkoxysilane has the general formula:

$$SiR_m(OR')_{4-m} \quad (I)$$

where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ arylalkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2.

Nonlimiting examples of suitable silane compositions include dicyclopentyldimethoxysilane; di-tert-butyldimethoxysilane; methylcyclohexyldimethoxysilane; methylcyclohexyldiethoxysilane; ethylcyclohexyldimethoxysilane; diphenyldimethoxysilane; diisopropyldimethoxysilane; di-n-propyldimethoxysilane; diisobutyldimethoxysilane; diisobutyldiethoxysilane; isobutylisopropyldimethoxysilane; di-n-butyldimethoxysilane; cyclopentyltrimethoxysilane; isopropyltrimethoxysilane; n-propyltrimethoxysilane; n-propyltriethoxysilane; ethyltriethoxysilane; tetramethoxysilane; tetraethoxysilane; diethylaminotriethoxysilane; cyclopentylpyrrolidinodimethoxysilane; bis(pyrrolidino)dimethoxysilane; bis(perhydroisoquinolino)dimethoxysilane; and dimethyldimethoxysilane. In an embodiment, the silane composition is dicyclopentyldimethoxysilane (DCPDMS); methylcyclohexyldimethoxysilane (MChDMS); or n-propyltrimethoxysilane (NPTMS); and any combination of thereof.

In an embodiment, the selectivity control agent component can be a mixture of 2 or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane. In an embodiment, the mixed external electron donor may include a benzoate, a succinate, and/or a diol ester. In an embodiment, the mixed external electron donor includes 2,2,6,6-tetramethylpiperidine as an SCA. In another embodiment, the mixed external electron donor includes a diether as both an SCA and an ALA.

A mixed external electron donor system can also includes an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate; ethyl p-methoxybenzoate; methyl p-ethoxybenzoate; ethyl p-ethoxybenzoate; ethyl p-isopropoxybenzoate; ethyl acrylate; methyl methacrylate; ethyl acetate; ethyl p-chlorobenzoate; hexyl p-aminobenzoate; isopropyl naphthenate; n-amyl toluate; ethyl cyclohexanoate and propyl pivalate.

Nonlimiting examples of suitable polycarboxylic acid esters include dimethyl phthalate; diethyl phthalate; di-n-propyl phthalate; diisopropyl phthalate; di-n-butyl phthalate; diisobutyl phthalate; di-tert-butyl phthalate; diisoamyl phthalate; di-tert-amyl phthalate; dineopentyl phthalate; di-2-ethylhexyl phthalate; di-2-ethyldecyl phthalate; diethyl terephthalate; dioctyl terephthalate; and bis[4-(vinyloxy)butyl]terephthalate.

The aliphatic carboxylic acid ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ mono- or polycarboxylate derivatives of $C_{2-100}$ (poly)glycols or $C_{2-100}$ (poly)glycol ethers. In a further embodiment, the $C_4$-$C_{30}$ aliphatic acid ester may be a laurate, a myristate, a palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{20}$ aliphatic ester is isopropyl myristate or di-n-butyl sebacate.

In an embodiment, the activity limiting agent includes a diether. The diether can be a 1,3-diether compound represented by the following structure (VI):

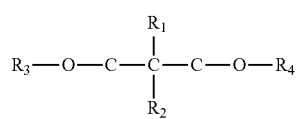

(VI)

wherein R1 to R4 are independently of one another an alkyl, aryl or aralkyl group having up to 20 carbon atoms, which may optionally contain a group 14, 15, 16, or 17 heteroatom, and Ri and R2 may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. R1 and $R_2$ may be linked to form a cyclic structure, such as cyclopentadiene or fluorene.

In an embodiment, the activity limiting agent includes a succinate composition having the following structure (VII):

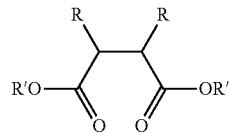

(VII)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

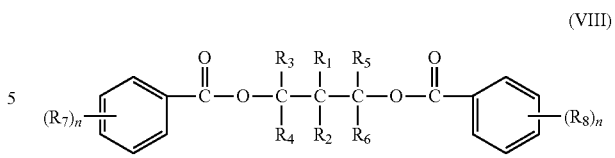

(VIII)

wherein n is an integer from 1 to 5. R1 and R2, may be the same or different, and each may be selected from hydrogen, methyl, ethyl, n-propyl, i-propyl, n-butyl, i-butyl, t-butyl, allyl, phenyl, or halophenyl group. $R_3$, $R_4$, R5, $R_6$, $R_7$, and $R_8$ may be the same or different, and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

Individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate; diisopropyldimethoxysilane and isopropyl myristate; dicyclopentyldimethoxysilane and poly(ethylene glycol) laurate; dicyclopentyldimethoxysilane and isopropyl myristate and poly(ethylene glycol) dioleate; methylcyclohexyldimethoxysilane and isopropyl myristate; n-propyltrimethoxysilane and isopropyl myristate; dimethyldimethoxysilane and methylcyclohexyldimethoxysilane and isopropyl myristate; dicyclopentyldimethoxysilane and n-propyltriethoxysilane and isopropyl myristate; diisopropyldimethoxysilane and n-propyltriethoxysilane and isopropyl myristate; and dicyclopentyldimethoxysilane and tetraethoxysilane and isopropyl myristate; dicyclopentyldimethoxysilane and diisopropyldimethoxysilane and n-propyltriethoxysilane and isopropyl myristate; and combinations thereof.

The catalyst composition includes a cocatalyst. The cocatalyst for use with the Ziegler-Natta procatalyst composition may be an aluminum containing composition. Nonlimiting examples of suitable aluminum containing compositions include organoaluminum compounds, such as trialkylaluminum; dialkylaluminum hydride; alkylaluminum dihydride; dialkylaluminum halide; alkylaluminumdihalide; dialkylaluminum alkoxide; and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA). The catalyst composition includes a mole ratio of aluminum (Al) to (SCA(s)+ALA(s)) of 0.5-25:1; or 1.0-20:1; or 1.5-15:1; or less than about 6.0; or less than about 5; or less than 4.5. In an embodiment, the Al:(SCA(s)+ALA(s)) mole ratio is 0.5-4.0:1. The total-SCA to ALA mole ratio is 0.01-20:1; 0.10-5.00:1; 0.43-2.33:1; or 0.54-1.85:1; or 0.67-1.5:1.

(b) Pipe

In another embodiment a pipe having a pressure endurance of at least 700 hours when tested at 90° C. and 5 MPa is provided, where such pipe is made from a composition comprising a propylene ethylene random copolymer having the following properties: (A) a melt flow rate (MFR) less than 1 g/10 min as determined according to ASTM D1238, at 230° C. and 2.16 Kg; (B) an ethylene content of from 3 to 5 percent by weight of the random copolymer; and (C) the xylene insoluble fraction of the random copolymer obtained by the wet method exhibits a [(Koenig B value)*(% mm)] ≥92.

Preferably the resin used in the pipe comprises 100% of the propylene ethylene random copolymer resins of the present invention, but up to 5%, 10%, 15% or even 25% by weight of one or more additional resins other than the copolymers defined herein may be added.

The copolymer composition used for making the pipe preferably contains antioxidants and acid scavengers, and in some applications may preferably also contain other additives commonly used in PP such as nucleators, mold release agents, slip agents, fillers, UV stabilizers, and colorants (pigments).

Pressure endurance testing is conducted as follows: Pipe is filled with 90° C. water and is immersed in a 90° C. water bath chamber. The pipe is pressurized to a hoop stress of 5 MPa, and time to failure is recorded. Three samples of each pipe is tested and the average brittle failure time is reported. Brittle failure time is the time at which a loss of pressure is observed. Typically, observable cracks are apparent when the loss of pressure is observed.

Preferably the pipes of the present invention have a pressure endurance of at least 700 hours, or 800 hours, more preferably at least 900 hours, at least 1000 hours, at least 1100 hours, at least 1200 hours and still more preferably greater than 2000 hours. Alternatively, pipes of the present invention have a pressure endurance of 800 hours to 3500 hours; or 900 to 3400 hours; or 750 hours to 3200 hours. In other words, each of the individual values between 700 to 3500 hours and each range formed by any two individual values between 700 hours or 800 hours to 3500 hours will be considered to have been recited without the need for recitation of all of the permutations and combinations of values.

EXAMPLES

In order to demonstrate the present invention, a series of pipes are made by extrusion at a melt temperature of 210° C. The pipes each have an outside diameter of 32 mm and a wall thickness of 3 mm. The materials used to make the pipe are described below and in Table 1. Each of the polymers used in Examples 1-4 contains about 4 wt. % ethylene comonomer.

Example 1 is made from a propylene-ethylene random copolymer produced with a stereospecific 6th generation Ziegler-Natta, Mg/Ti-based catalyst, containing a non-phthalate internal donor having a broader MWD and similar tacticity as Comparative Example 4.

Example 2 is made from a propylene-ethylene random copolymer having high molecular weight, low MFR, produced with the same stereospecific 6th generation Ziegler-Natta catalyst containing a non-phthalate internal donor as Example 1, and having a broad MWD, but higher tacticity than Example 1, as evidenced by the lower XS and higher mm triad values. Example 2 shows superior pipe performance.

Example 3 is made from a propylene-ethylene random copolymer (resin) having high molecular weight, low MFR, produced with the same stereospecific 4th generation Ziegler-Natta catalyst containing a phthalate internal donor (DIBP) as that used in Comparative Example 4. In other words, the resin used for Example 3 was made using the same catalyst as Comparative Example 4, but was produced to have higher tacticity (similar in approach to Example 2 versus Example 1), as evidenced by the lower XS and higher mm triad values. Example 3 shows superior pipe performance relative to Comparative Example 4, but not as good as Example 2.

Comparative Example 4 is made from a propylene-ethylene random copolymer having high molecular weight, low MFR, produced with a stereospecific 4th generation Ziegler-Natta catalyst containing a phthalate internal donor (diisobutyl phthalate, DIBP).

All copolymers in the examples use triethylaluminum (TEAL) as a cocatalyst and each example uses an external donor, as is generally known in the art. In Examples 2 and 3 the amount of external donor relative to the other components of the catalyst system was increased in order to increase tacticity and decrease the amount of the xylene soluble fraction.

The polymers in the examples are each stabilized with additives while being extruded into pellets using a twin screw extruder. The additive package in all examples consists of two hindered phenol type antioxidants (Irganox™ 1010 (1500 ppm) & Ethanox™ 330 (3000 ppm)), along with a phosphite (Irgafos™ 168 (1500 ppm)) and acid scavenger (calcium stearate (700 ppm)). The total amount of additives is 6700 ppm.

These pipes are then tested for pressure endurance using the method described above. The results for each test is also included in Table 1. As seen in the table, copolymer resins with lower xylene solubles, higher values for the combined variable mm*B (mm tacticity multiplied by the Koenig B value for the xylene insoluble fraction) and higher Koenig B×I values tend to produce more durable pipes.

TABLE 1

| | Example | | | |
|---|---|---|---|---|
| | 1 | 2 | 3 | 4 (comparative) |
| MFR (g/10 min) | 0.20 | 0.18 | 0.20 | 0.19 |
| XS, wt % | 7.0 | 4.3 | 4.5 | 7.9 |
| PDI | 5.3 | 4.5 | 4.2 | 4.4 |
| Ethylene, wt %** | 4.1 | 4.2 | 4.1 | 4.1 |
| NMR Analysis | | | | |
| mm*B, XI | 92.5 | 98.4 | 94.8 | 89.6 |
| mm, % XI | 97.4 | 98.4 | 98.7 | 97.4 |
| Koenig B value, XI | 0.95 | 1 | 0.96 | 0.92 |
| Pipe endurance*, hrs. @ 90° C./5 MPa | 800 | 3268 | 1612 | 491 |

XS = xylene soluble fraction;
XI = xylene insoluble fraction
*average of three tests
**Listed values measured using Fourier Transform Infrared method (FTIR)

Referring to FIG. 1, it is observed that the variable mm*B for the xylene insoluble fraction of the polymer correlates well with pipe endurance performance at elevated temperature and pressure (note that the acronym PPR in the FIGURE refers to "polypropylene random copolymer").

Additional comparative tests 5, 6 and 7 are conducted using commercial polypropylene random copolymers using Hyosung R200P, Yanshan 4220 and KPIC 2400 according to the same tests as described for examples 1-4 above. Test results are summarized in Table 2:

TABLE 2

| | Comparative Example | | |
|---|---|---|---|
| | 5 | 6 | 7 |
| Sample | 1 | 2 | 3 |
| MFR (g/10 min) | 0.28 | 0.3 | 0.28 |
| XS**, wt % | 7.2 | 7.1 | 5.9‡ |
| PDI | 4.4 | 3.8 | 3.9 |
| Ethylene, wt % | 3.8 | 3.7 | 3.9 |
| NMR Analysis | | | |
| mm*B, XI | 91.6 | 91.7 | 90.5 |
| mm, % XI | 98.5 | 97.6 | 98.4 |
| Koenig B value, XI | 0.93 | 0.94 | 0.92 |
| Pipe endurance, hrs. @ 90° C./5 MPa | 546 | 213 | 355 |

**Viscotek method

‡An undefined amount of xylene soluble polymer may have been removed during the polymerization process for this polymer A further test is conducted using the propylene-ethylene random copolymer according to Example 3 to which is added 2000 ppm of the commercial beta nucleating agent NJStar NU-100 (N,N'-dicyclohexylnaphthalene-2,6-dicarboxamide from New Japan Chemical) in combination with the stabilizing additives identified above using a twin screw extruder. Pipe endurance is increased to 2560 hrs. compared to the non-nucleated copolymer.

What is claimed is:

1. A composition suitable for pipe applications comprising a propylene ethylene random copolymer, the copolymer having the following properties:
   (A) a melt flow rate (MFR) less than 1 g/10 min as determined according to ASTM D1238, at 230° C. and 2.16 kg;
   (B) an ethylene content of from 3 to 5 percent by weight of the random copolymer;
   (C) a xylene insoluble fraction of the random copolymer which is obtained by the wet method, wherein said fraction exhibits a [(Koenig B value)*(% mm)]≥92; and
   (D) a xylene solubles content measured by the wet method of ≤7.0% by weight.

2. The composition of claim 1 wherein the xylene insoluble fraction of the copolymer obtained by the wet method is further characterized by having a Koenig B value equal to or greater than 0.95.

3. The composition of claim 1 wherein the (percentage mm of the xylene insoluble fraction of the copolymer obtained by the wet method)×(Koenig B value of the xylene insoluble fraction of the copolymer obtained by the wet method) is greater than 92.0 to less than 100.

4. The composition of claim 1 wherein the copolymer has an ethylene content of from 3.2 to 4.2 percent by weight of the copolymer.

5. The composition of claim 1 wherein the copolymer is further characterized by having a Polymer Dispersity Index (PDI) greater than 4.0.

6. The composition of claim 1 wherein the copolymer is characterized as having a PDI≥4.0, xylene solubles content as measured by the wet method ≤7% by weight, Koenig B value of the xylene insoluble fraction of the copolymer obtained by the wet method ≥0.95 and a percentage mm of the xylene insoluble fraction of the copolymer obtained by the wet method ≥97.

7. The composition of claim 1 wherein the copolymer is beta nucleated.

8. The composition of claim 1 in the form of a pipe and wherein the pipe has a pressure endurance of at least 700 hours when tested at 90° C. and 5 MPa.

9. The composition of claim 1 which is further characterized as containing substantially no phthalate compositions.

10. The composition of claim 1 wherein MFR is from 0.1 to 0.5 g/10 min.

* * * * *